Oct. 10, 1939.  F. W. GRICE  2,175,289
DIRECTION SIGNAL
Filed July 30, 1938  2 Sheets-Sheet 2
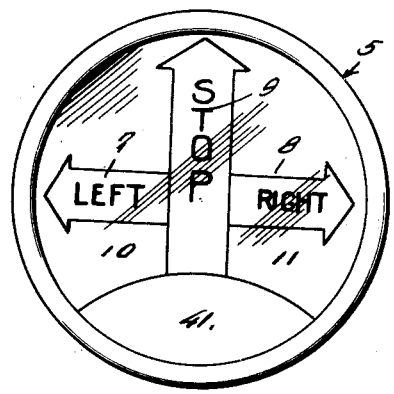
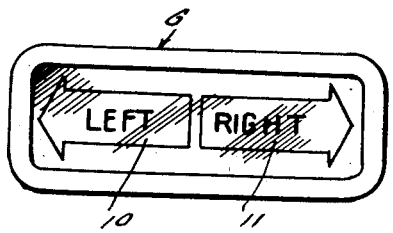
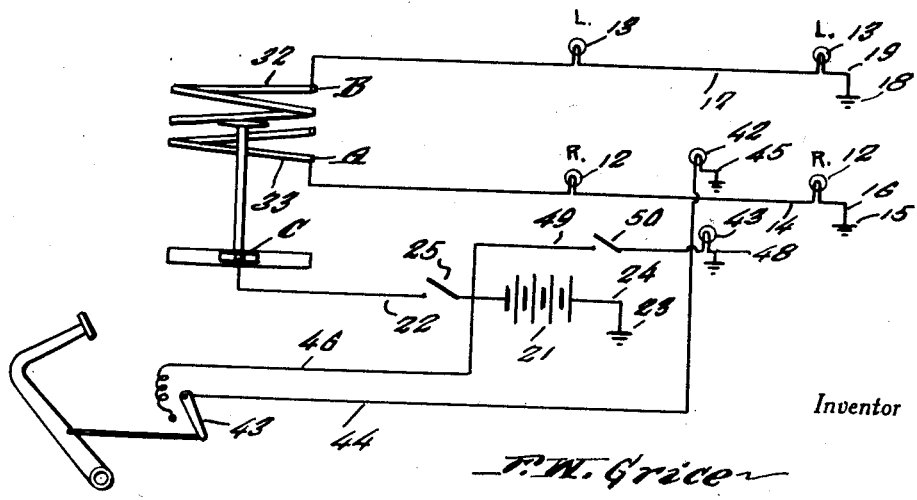
Inventor
F. W. Grice
By Clarence A. O'Brien
and Hyman Berman
Attorneys Patented Oct. 10, 1939

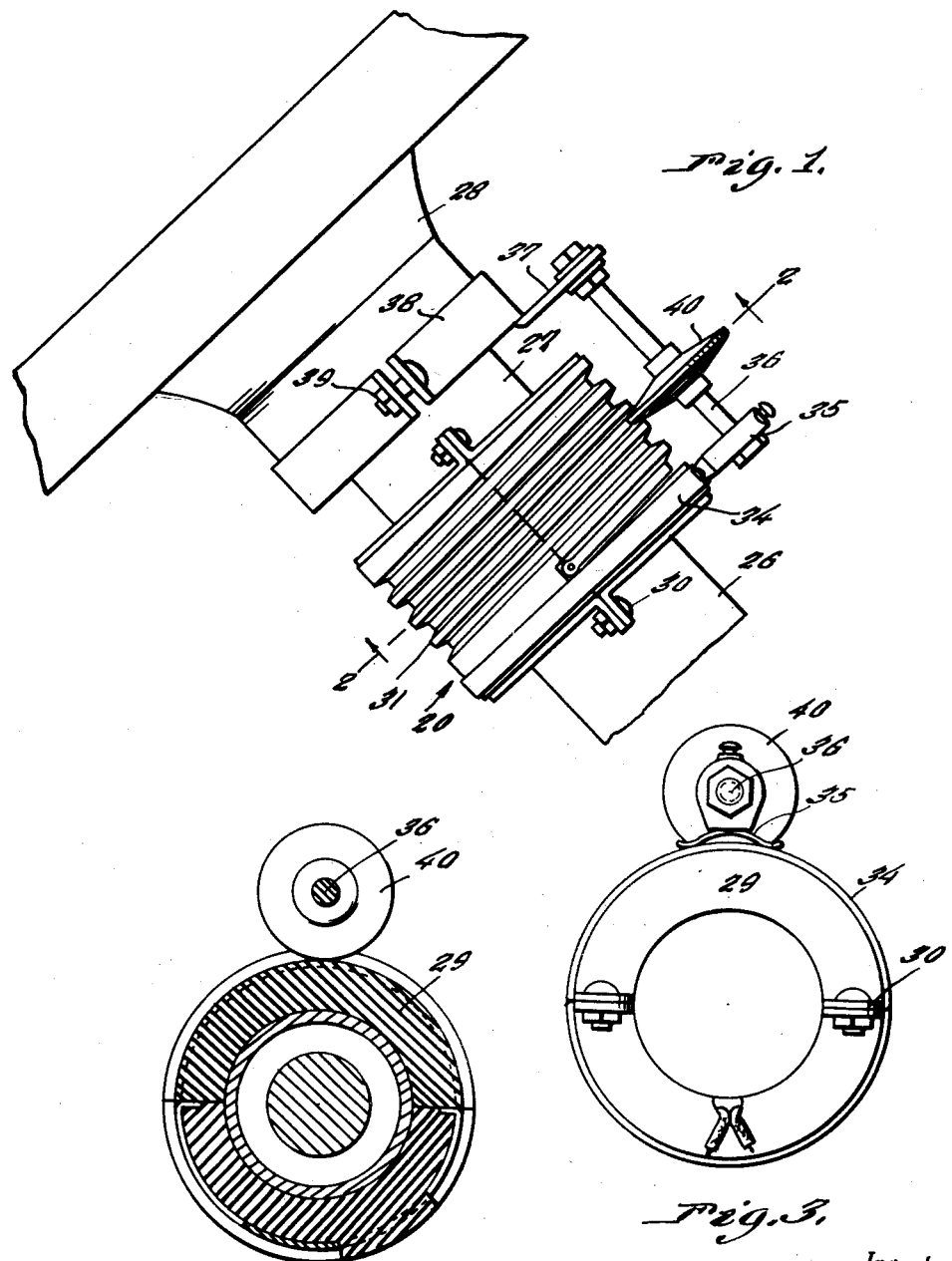

2,175,289

UNITED STATES PATENT OFFICE 2,175,289

DIRECTION SIGNAL

Fred Warren Grice, Girard, Ohio

Application July 30, 1938, Serial No. 222,259

1 Claim. (Cl. 200—59)

This invention relates to electric signals for automobiles and like vehicles for indicating direction turns from a straight course and for indicating a reduction of speed of the automobile and of a stop of the latter.

The present invention has for the primary object, the provision of electrically illuminated signals to indicate turns either to the left or right and for slowing down of the speed of the vehicle and which operates entirely automatically, so that no attention or effort will be required of the driver of the vehicle for its successful operation.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a fragmentary side elevation illustrating a portion of a steering wheel and its post on which is mounted a switch for the automatic control of the electric signals of the present invention.

Figure 2 is a sectional view taken on line 2—2 of Figure 1.

Figure 3 is an end view illustrating the switch.

Figure 4 is a front elevation illustrating the rear signal.

Figure 5 is a front elevation illustrating the front signal.

Figure 6 is a diagrammatical view illustrating the wiring diagram of the electric signal.

Referring in detail to the drawings, the numeral 5 indicates a rear signal and 6 indicates a front signal. The rear signal 5 is adapted to be mounted in any suitable place upon the rear of an automobile. The rear signal 5 has arrows applied thereto in any suitable way, one of which indicates a left turn and is designated by the numeral 7, another a right turn indicated by the numeral 8 and another indicating a stop designated by the character 9. The left and right signals 7 and 8 are disposed in opposite directions and horizontally, while the stop signal is disposed vertically.

The front signal 6 includes indicating arrows 10 and 11 bearing the characters "left" and "right" and corresponding with the arrows 7 and 8 of the rear signal. Electric lamps 12 are arranged in rear of the arrows 8 and 11 of the rear and front signals and electric lamps 13 are arranged in rear of the arrows 7 and 10 of the rear and front signals 5 and 6. The electric lamps 12 are simultaneously illuminated so as to indicate at the front and rear of the automobile a right hand turn, while the electric lamps 13 are simultaneously illuminated to indicate a left hand turn at the front and rear of the automobile. It is to be understood that the casing of the front and rear signals may be divided into compartments with the arrows arranged in front of said compartments so that when one of the arrows is illuminated the other arrows will be non-illuminated.

The electric lamps 12 are connected by a conductor 14 and also said electric lamps are connected to a ground 15 by a conductor 16. The electric lamps 13 are connected by a conductor 17 and also connected to a ground 18 by a conductor 19. The conductor 14 is connected to a terminal A of a switch 20 while the conductor 17 is connected to a terminal B of said switch 20. A terminal C of the switch 20 is connected to a battery 21 of the automobile by a conductor 22. The battery is connected to a ground 23 by a conductor 24. A control switch 25 of the manually actuated type, is connected in the conductor 22.

The switch 20 is mounted on the column 26 of the steering post 27 of the automobile. It is to be understood that the column 26 is non-rotatable while the post 27 is rotatable by the steering wheel 28 connected thereto. The switch 20 consists of a sectional cylindrical shaped body 29 to fit about the column 26 and the sections thereof are detachably connected by bolts 30. Formed in the body is a spiral groove 31 and located in said spiral groove are spiral contacts 32 and 33 having the adjacent ends spaced substantially intermediate the ends of the spiral groove. The spiral contact 32 is connected to the terminal B while the spiral contact 33 is connected to the terminal A. The terminal C is connected to an annular contact 34 mounted on the lower end of the body 29 and is engaged by a contact 35 carried by a shaft 36. The shaft 36 is supported by a bracket 37 mounted on a clamp 38 which positions the shaft 36 a selected distance from the spiral groove of the body. The clamp 38 is of the split type and is fitted on the hub of the steering wheel 28. A bolt 39 is employed for securing the clamp 38 tightly upon the hub of the steering wheel. Rotatably and slidably mounted on the shaft 36 is a disc-type contact 40 which travels in the spiral groove of the body and into and out of engagement with the contacts 32 and 33 by the rotation of the steering wheel 28 in opposite directions for the purpose of steering the vehicle to the right and left. When the steering wheel 28 is positioned for steering the vehicle in a straight course, the disc-type contact 40 is in engagement with the portion of the spiral groove non-occupied by the spiral contacts 32 and 33. The steering wheel may have a limited movement in either direction before the disc-contact 40 engages either of the spiral contacts 32 or 33 so that slight movement of the steering wheel of the motor vehicle to the right or left will not affect the signals. However, when the steering wheel is turned a sufficient distance in either direction for a right or left hand turn, the disc contact 40 engages with the spiral contact 33 or the spiral contact 32, depending in which direction the steering wheel 28 is turned. As soon as the disc contact 40 engages the contact 32 by turning the steering wheel 28 to the left, the electric lamp 13 will be illuminated and in turn illuminates the arrows 7 and 10 of the signals 5 and 6 to give a warning of a turn to the left. The turning of the steering wheel 28 from a straight course to the right brings the disc contact 40 into engagement with the contact 33 completing the electric circuit to the electric lamps 12, illuminating the arrows 8 and 11 of the rear and front signals 5 and 6 to indicate a right hand turn.

A switch of the character shown and described in detail is easily mounted on any steering post and steering wheel now in use on a motor vehicle, also the rear and front signals may be readily mounted on the front and rear ends of the automobile. The rear signal also includes a stop light lens indicated by the character 41 and which also acts as a rear tail light. Electric lamps 42 and 43 are employed for illuminating the combined stop and tail light lens 41. A brake operated switch 43' is electrically connected to the electric lamp 42 by a conductor 44 and the electric lamp 42 is connected to the electric ground by a conductor 45. The switch 43' is connected to the battery through the conductor 22 by a conductor 46 so that on the application of the brakes the electric lamp 42 will be illuminated for the purpose of indicating through the illumination of the lens 41 of a reduction in speed of the automobile or of a stop. The electric lamp 43 is connected to the electric ground by a conductor 48 and is connected to the battery 21 by a conductor 49 being connected to the conductor 22. The conductor 49 has a manually controlled switch 50 connected therein. The electric lamp 43 is for the purpose of illuminating the lens 41 to act as a tail light for the automobile. It is preferable that the electric lamp 43 be of a small candle power while the electric lamp 42 is of a large candle power so as to illuminate the lamp 41 brighter than the illumination provided by the electric lamp 43.

A signal of the character described may be manufactured at a low cost and is simple in construction and readily installed on any automobile now in use and will be entirely automatic in operation, consequently eliminating manual control or the attention of the driver of the motor vehicle or automobile at any time.

It is believed that the foregoing description, when taken in connection with the drawings, will fully set forth the construction and advantages of this invention to those skilled in the art to which such a device relates, so that further detailed description will not be required.

What I claim is:

A switch comprising a sectional insulated body adapted to be mounted on a steering column of a steering wheel of an automobile and having a spiral groove, means for detachably connecting together the sections of said body, spiral contacts mounted in said spiral groove and having their adjacent ends spaced and located substantially intermediate the ends of the spiral groove to provide a dead space, an annular contact mounted on one end of said body for connection to an electric circuit, a shaft paralleling and spaced from said body, a split clamp secured to one end of said shaft and mounted on a hub of a steering wheel for supporting and moving said shaft with the steering wheel, a spring contact carried by one end of said shaft and engaging with the annular contact, and a disc type contact rotatably and slidably mounted on said shaft and extending into the groove and movable into and out of engagement with the spiral contacts in accordance with the direction in which the steering wheel is turned.

FRED WARREN GRICE.